US012390921B2

(12) United States Patent
Liu

(10) Patent No.: US 12,390,921 B2
(45) Date of Patent: Aug. 19, 2025

(54) EXPANDABLE TOOL BOX ASSEMBLY

(71) Applicant: ERSSON CO., LTD., Taichung (TW)

(72) Inventor: Ming-Hsien Liu, Taichung (TW)

(73) Assignee: ERSSON CO., LTD., Taichung (TW)

( * ) Notice: Subject to any disclaimer, the term of this patent is extended or adjusted under 35 U.S.C. 154(b) by 16 days.

(21) Appl. No.: 18/427,871

(22) Filed: Jan. 31, 2024

(65) Prior Publication Data

US 2025/0242484 A1 Jul. 31, 2025

(51) Int. Cl.

| | |
|---|---|
| ***B25H 3/02*** | (2006.01) |
| ***B65D 25/20*** | (2006.01) |
| ***B65D 25/28*** | (2006.01) |

(52) U.S. Cl.

CPC ............. *B25H 3/028* (2013.01); *B65D 25/20* (2013.01); *B65D 25/2841* (2013.01)

(58) Field of Classification Search

CPC ..... B25H 3/028; B65D 25/20; B65D 25/2841
USPC .................................................. 206/372, 373
See application file for complete search history.

(56) References Cited

U.S. PATENT DOCUMENTS

| | | | | |
|---|---|---|---|---|
| 4,733,703 A * | 3/1988 | Cimino | B25H 1/12 | 144/285 |
| 5,725,037 A * | 3/1998 | Faulhaber | B25H 3/04 | 144/287 |
| 6,578,937 B1 * | 6/2003 | Thoman | B25H 3/028 | 312/902 |
| 8,714,355 B2 * | 5/2014 | Huang | B25H 3/028 | 312/111 |
| 2015/0069076 A1 * | 3/2015 | Liu | B25H 3/02 | 220/759 |
| 2016/0008972 A1 * | 1/2016 | Chen | B25H 3/02 | 206/373 |

* cited by examiner

*Primary Examiner* — Jacob K Ackun
(74) *Attorney, Agent, or Firm* — WPAT, PC

(57) ABSTRACT

A tool box assembly has at least one tool box, and each tool box has a container, at least one first assembling structure, at least one second assembling structure, and at least one drawer. The container of each tool box has a base and a surrounding wall erectly disposed at the base. Each second assembling structure is configured to engage with each first assembling structure. The at least one drawer of each tool box is disposed within the container of the tool box and is able to enter or exit from the container via a front opening of the container.

12 Claims, 10 Drawing Sheets

EXPANDABLE TOOL BOX ASSEMBLY

BACKGROUND OF THE INVENTION

1. Field of the Invention

The present invention relates to a tool box assembly, and more particularly to a tool box assembly which occupies less space and is expandable.

2. Description of Related Art

In order to store various kinds of hand tools systematically and for users to efficiently choose and retrieve the hand tools, the hand tools are stored in a tool box with many trays according to the kinds of the hand tools.

A traditional tool box has a container, multiple isolated plates, and multiple trays. The multiple isolated plates are disposed in parallel inside the container and divide the interior of the container into multiple chambers. The multiple trays are respectively disposed at the multiple isolated plates within the chambers.

In addition, hand tools of the same kind are stored in a container to be conveniently carried. A conventional tool box has multiple containers being longitudinally expandable for storing hand tools of various kinds respectively.

However, in the traditional tool box, the isolated plates and bottom of the trays are longitudinally stacked up and a volume of the traditional tool box is increased in a longitudinal direction. Furthermore, in the conventional tool box with multiple containers, a top and a bottom of adjacent two containers are stacked up and also longitudinally increase the volume of the conventional tool box.

Therefore, structures of the traditional tool box and the conventional tool box need to be further improved.

To overcome the shortcomings of the conventional tool box, the present invention provides a tool box assembly to mitigate or obviate the aforementioned problems.

SUMMARY OF THE INVENTION

The main objective of the present invention is to provide a tool box assembly that occupies less space and is expandable.

The tool box assembly has at least one tool box, and each tool box has a container, at least one first assembling structure, at least one second assembling structure, and at least one drawer. The container of each tool box has a base and a surrounding wall erectly disposed at the base. Each second assembling structure is configured to be engaged with each first assembling structure. The at least one drawer of each tool box is disposed within the container of the tool box and able to enter or exit from the container via a front opening of the container.

Other objects, advantages, and novel features of the invention will become more apparent from the following detailed description when taken in conjunction with the accompanying drawings.

DETAILED DESCRIPTION OF PREFERRED EMBODIMENTS

Figure 1:
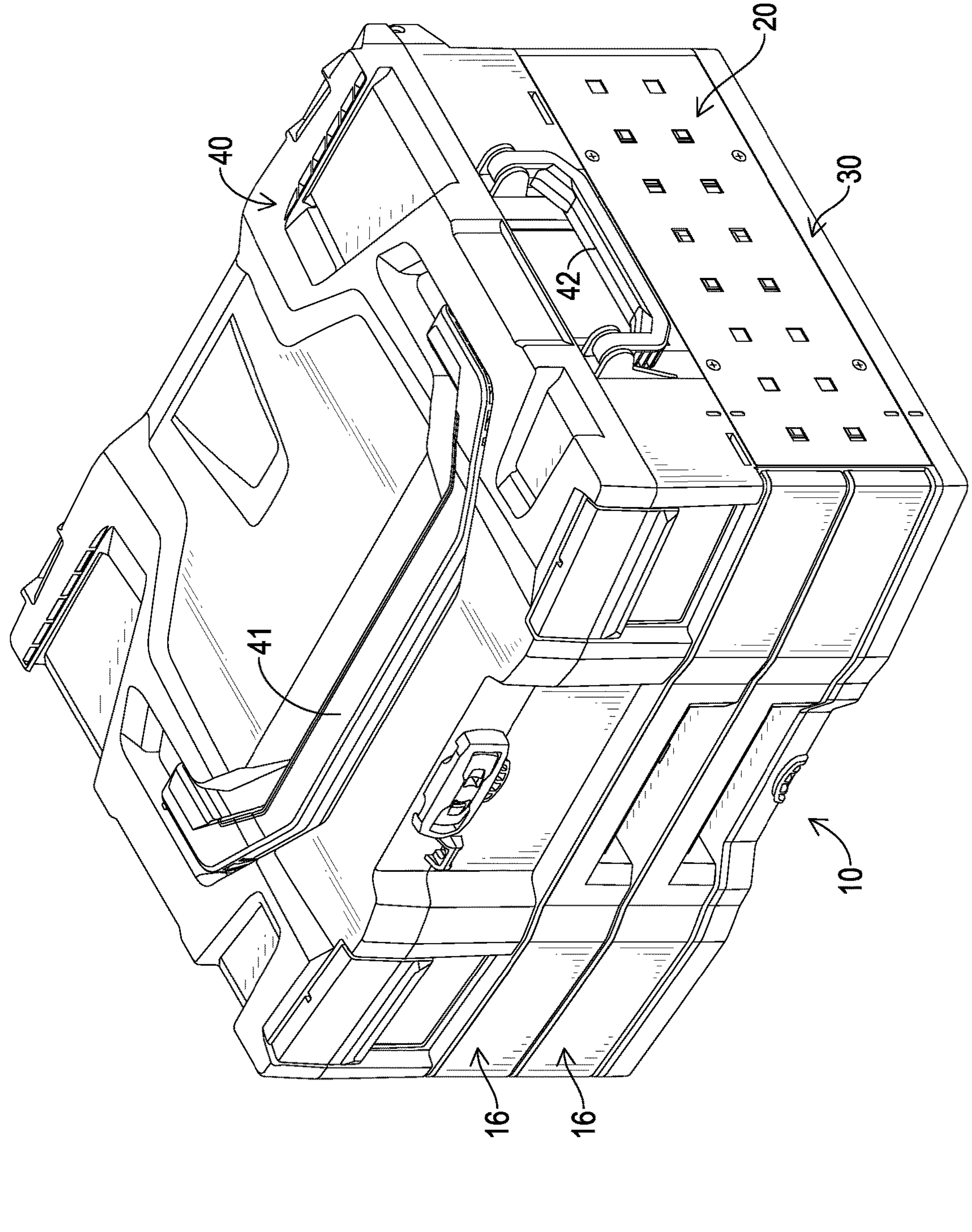
FIG. 1 is a perspective view of a tool box assembly in accordance with the present invention.
Figure 2:
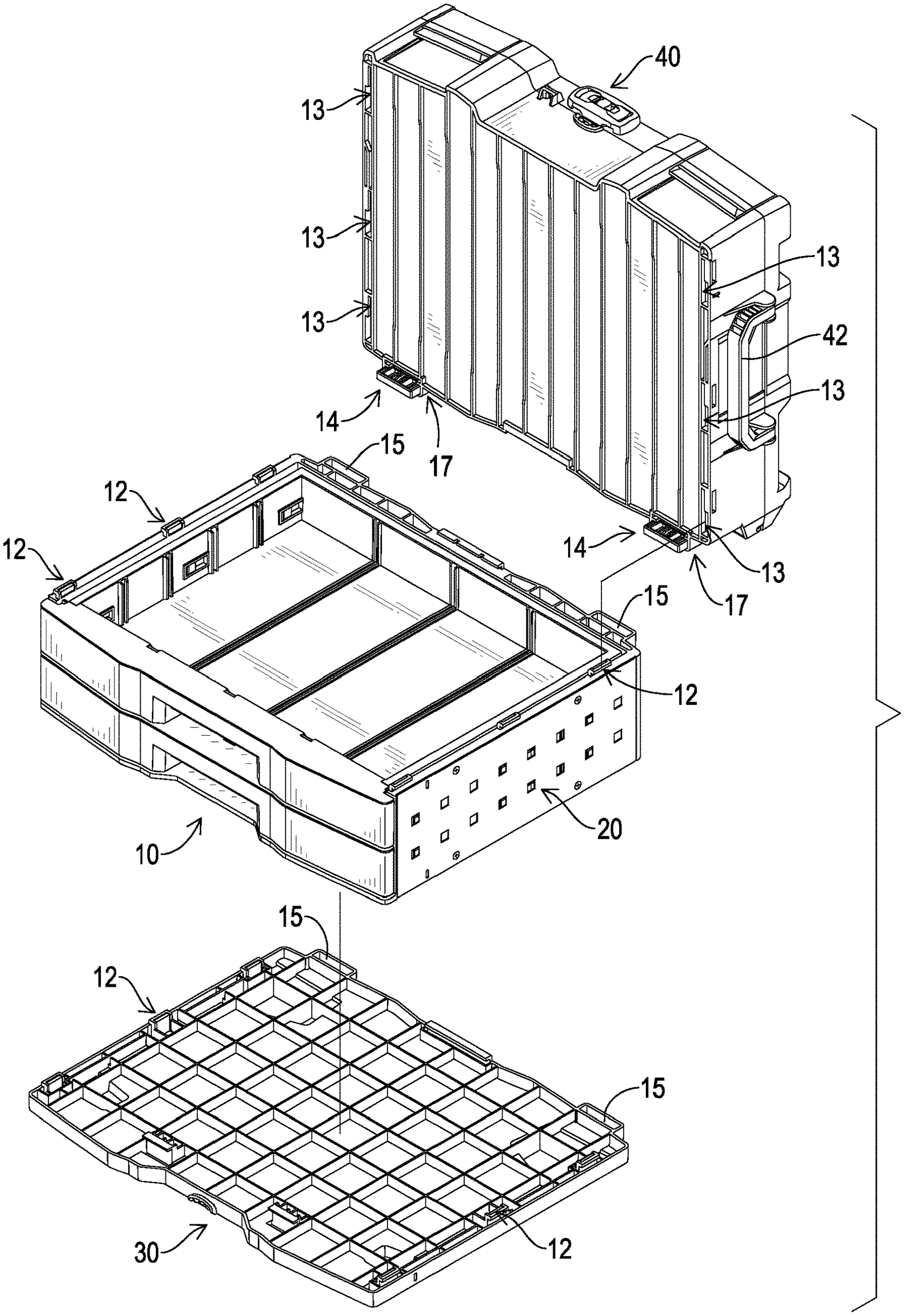
FIG. 2 is an exploded perspective view of the tool box assembly in FIG. 1.

With reference to FIGS. 1 and 2, a tool box assembly in accordance with the present invention has a tool box 10, two pegboards 20, a basal plate 30, and a portable case 40.

Figure 3:
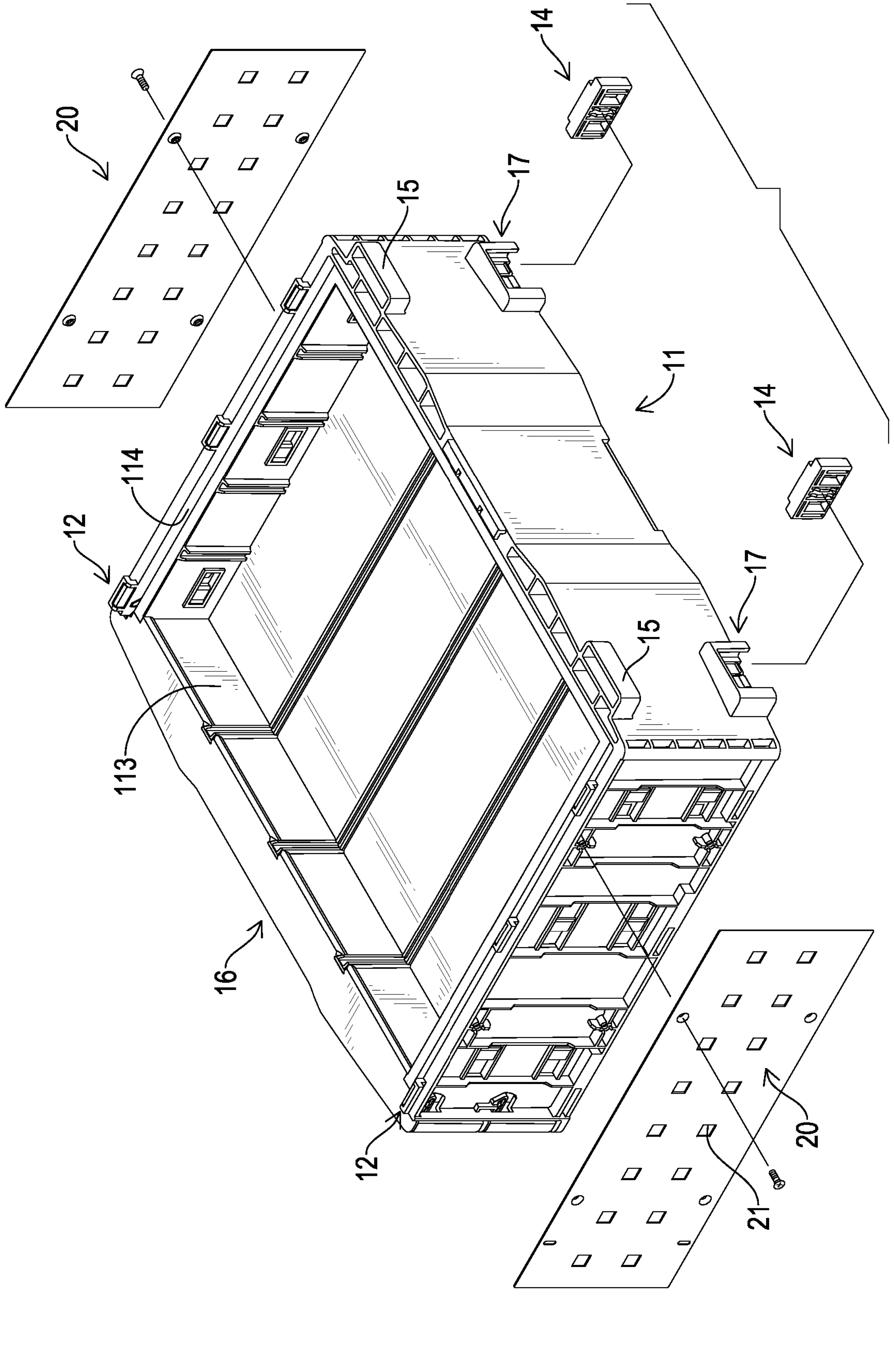
FIG. 3 is another exploded perspective view of the tool box assembly in FIG. 1.

With reference to FIGS. 2 and 3, the tool box 10 has a container 11, six first assembling structures 12, six second assembling structures 13, two first positioning structures 14, two second positioning structures 15, and two drawers 16. The container 11 has a base 111, a surrounding wall 112, a front opening 113, and a top opening 114. The base 111 is a plate. The surrounding wall 112 is erectly disposed at the base 111, forms the front opening 113 and the top opening 114, and has a top portion disposed opposite to the base 111. Specifically, the surrounding wall 112 has two lateral plates 1121 and a rear plate 1122. The two lateral plates 1121 are respectively disposed at two opposite sides of the container 11. The rear plate 1122 is disposed at a rear side of the container 11.

With reference to FIGS. 2 and 3, the front opening 113 communicates with an interior of the container 11, is disposed at a front side of the container 11, and is opposite to the rear plate 1122. The top opening 114 communicates with the interior of the container 11, is disposed at the top portion of the surrounding wall 112, and is opposite to the base 111.

Figure 6:
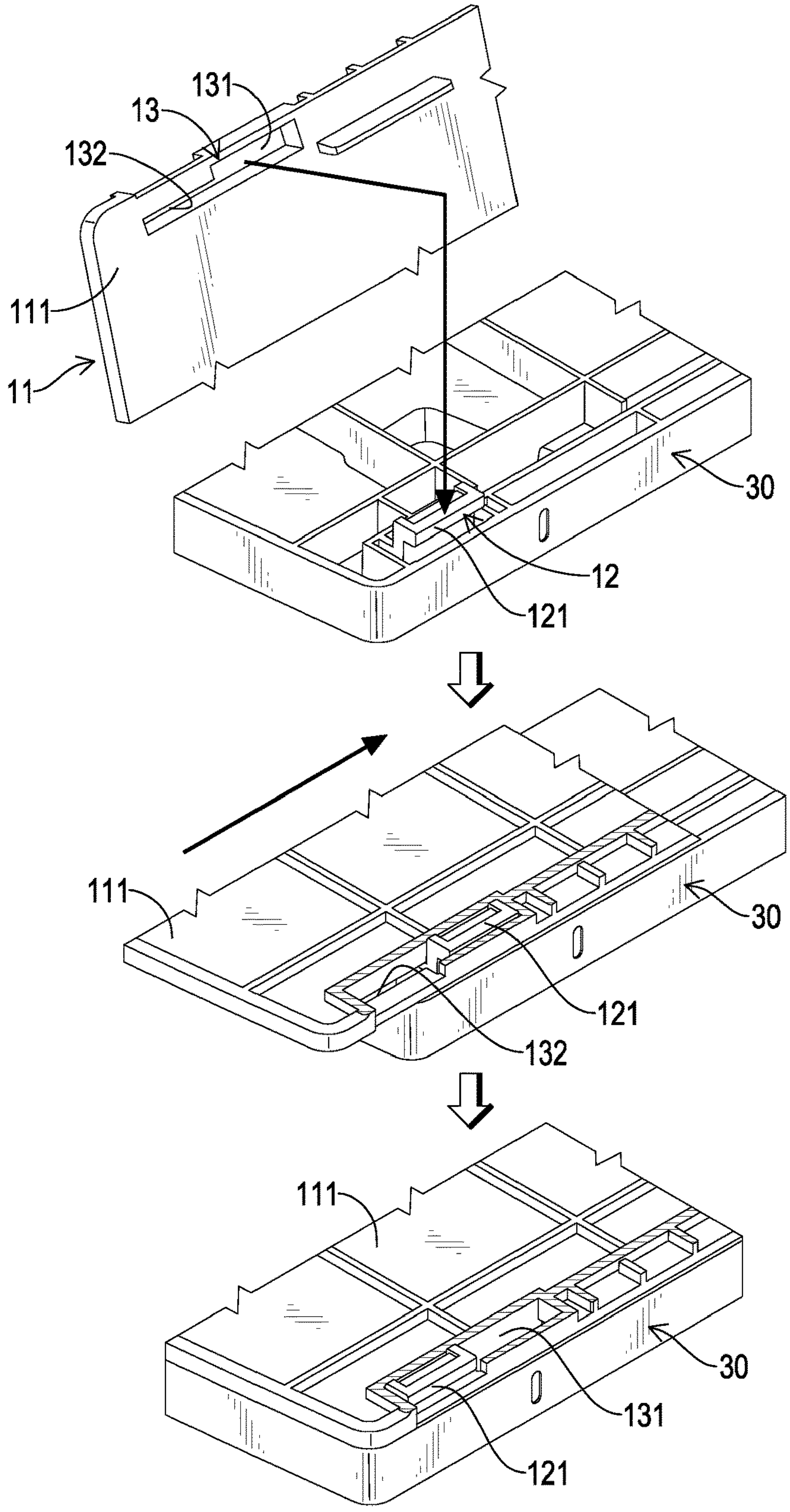
FIG. 6 is a schematic view of assembling the tool box assembly in FIG. 1.

With reference to FIGS. 2, 3, and 6, each one of the six first assembling structure 12 is disposed at the top portion of the surrounding wall 112 and has a blocking plate 121. The blocking plate 121 of each first assembling structure 12 protrudes laterally and extends toward the front opening 113. In the embodiment of the present invention, three of the six first assembling structures 12 are disposed at one of the two lateral plates 1121, and the other three of the six first assembling structures 12 are disposed at the other one of the two lateral plates 1121.

Figure 4:
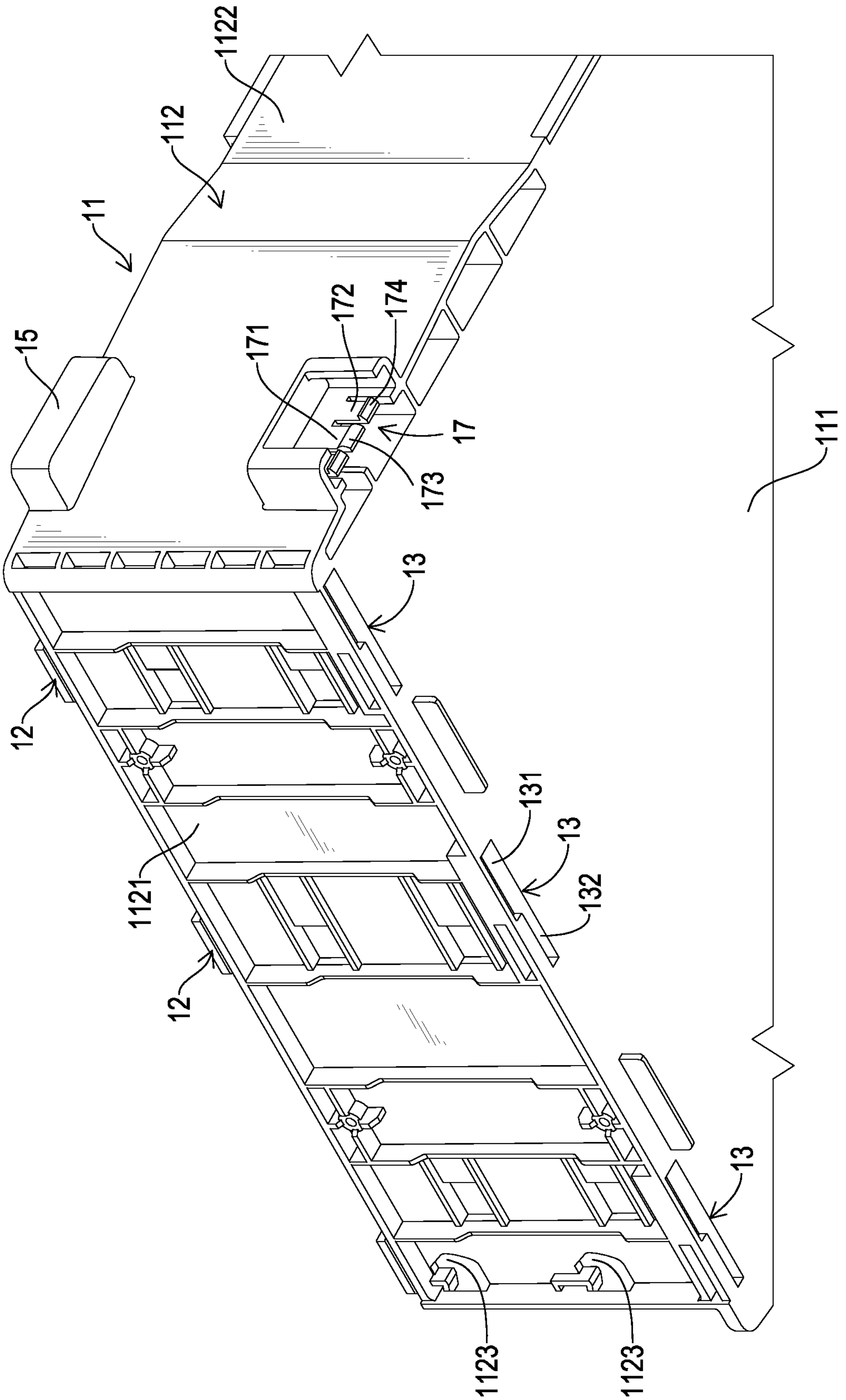
FIG. 4 is a perspective view of a container of the tool box assembly in FIG. 1.

With reference to FIG. 4, each one of the six second assembling structures 13 is disposed at the base 111. Each second assembling structure 13 is configured to be engaged with each first assembling structure 12 and has an inserting hole 131 and an engaging groove 132. The inserting hole 131 of each second assembling structure 13 communicates with the engaging groove 132 of the second assembling structure 13 in a direction toward the front opening 113. The engaging groove 132 of each second assembling structure 13 is disposed more adjacent to the front opening 113 than the inserting opening 131 of the second assembling structure 13. The inserting hole 131 of each second assembling structure 13 has a width larger than a width of the engaging groove of the second assembling structure 13. In the embodiment of the present invention, the three of the six second assembling structures 13 are disposed at one of the two sides of the container 11, and the other three of the six second assembling structures 13 are disposed at the other one of the two sides of the container 11.

With reference to FIGS. 2 and 3, each one of the two first positioning structures 14 is an engaging unit, is connected to the surrounding wall 112 of the container 11, and is moveable relative to the container 11 longitudinally. Each one of the two second positioning structures 15 is a recess and is disposed at the surrounding wall 112 of the container 11. Each second positioning structure 15 is configured to engage with each first positioning structure 14.

With reference to FIGS. 2 and 4, in the embodiment of the present invention, each first positioning structure 14 is disposed at a bottom of the surrounding wall 112, is disposed within a guiding groove 17, and is longitudinally movable relative to the container 11 accordingly. Each first positioning structure 14 has two positioning recesses 141 and two blocking portions 142. The guiding groove 17 has a positioning unit 171 and two restricting units 172. The positioning unit 171 is resilient and swingable and has a positioning protrusion 173 to engage with one of the two positioning recesses 141 of each first positioning structure 14 for positioning the first positioning structure 14 in a longitudinal direction. Each one of the two restricting units 172 has a restricting hook 174 to restrict a corresponding one of the two blocking portions 142 of each first positioning structure 14 to prevent the first positioning structure 14 from detaching from the guiding groove 17.

Figure 5:
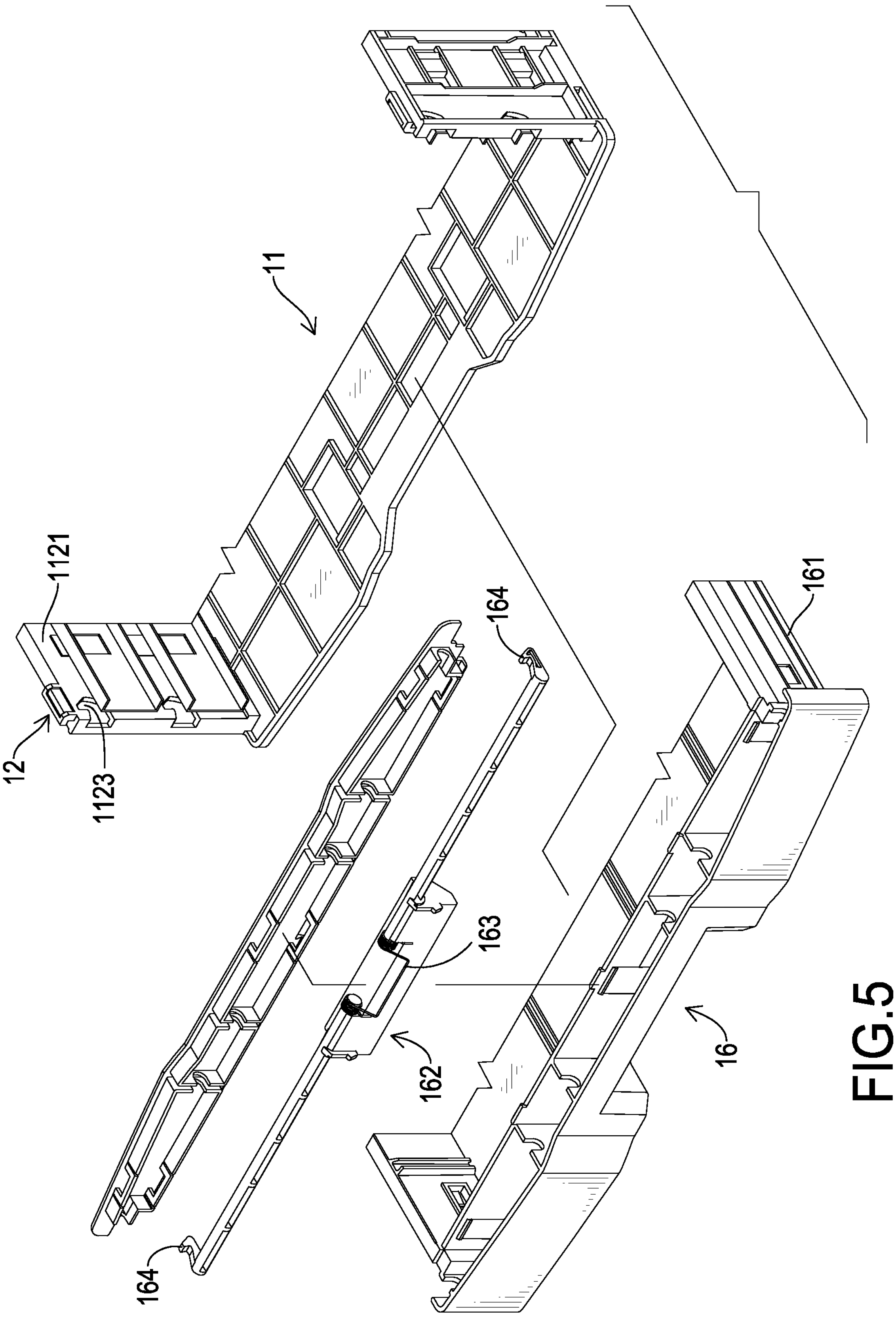
FIG. 5 is an exploded perspective view of a drawer of the tool box assembly in FIG. 1.

With reference to FIGS. 4 and 5, each one of the two drawers 16 is disposed within the container 11 and able to enter or exit from the container 11 via the front opening 113. Each drawer 16 has a drawer body 161, a handle 162, and a torsion spring 163. The handle 162 is pivotally connected to the drawer body 161 and has two opposite ends respectively extending toward the two lateral plates 1121 of the surrounding wall 112 and two hooks 164 respectively disposed at the two opposite ends of the drawer body 161. The torsion spring 163 is connected to the handle 162 and abuts against the drawer body 161 and the handle 162 simultaneously. The handle 162 is configured to be driven by the torsion spring 163 to engage with two engaging holes 1123 disposed at the surrounding wall 112 via the two hooks 164 of the handle 162. The drawer 16 is prevented from accidentally moving out from the container 11 accordingly. When a user attempts to draw each drawer 16, the handle 162 of the drawer 16 is operated to compress the torsion spring 163. The two hooks of the handle 162 of the drawer 16 are able to detach from the two engaging holes 1123, and the drawer 16 can be moved out from the container accordingly.

Figure 9:
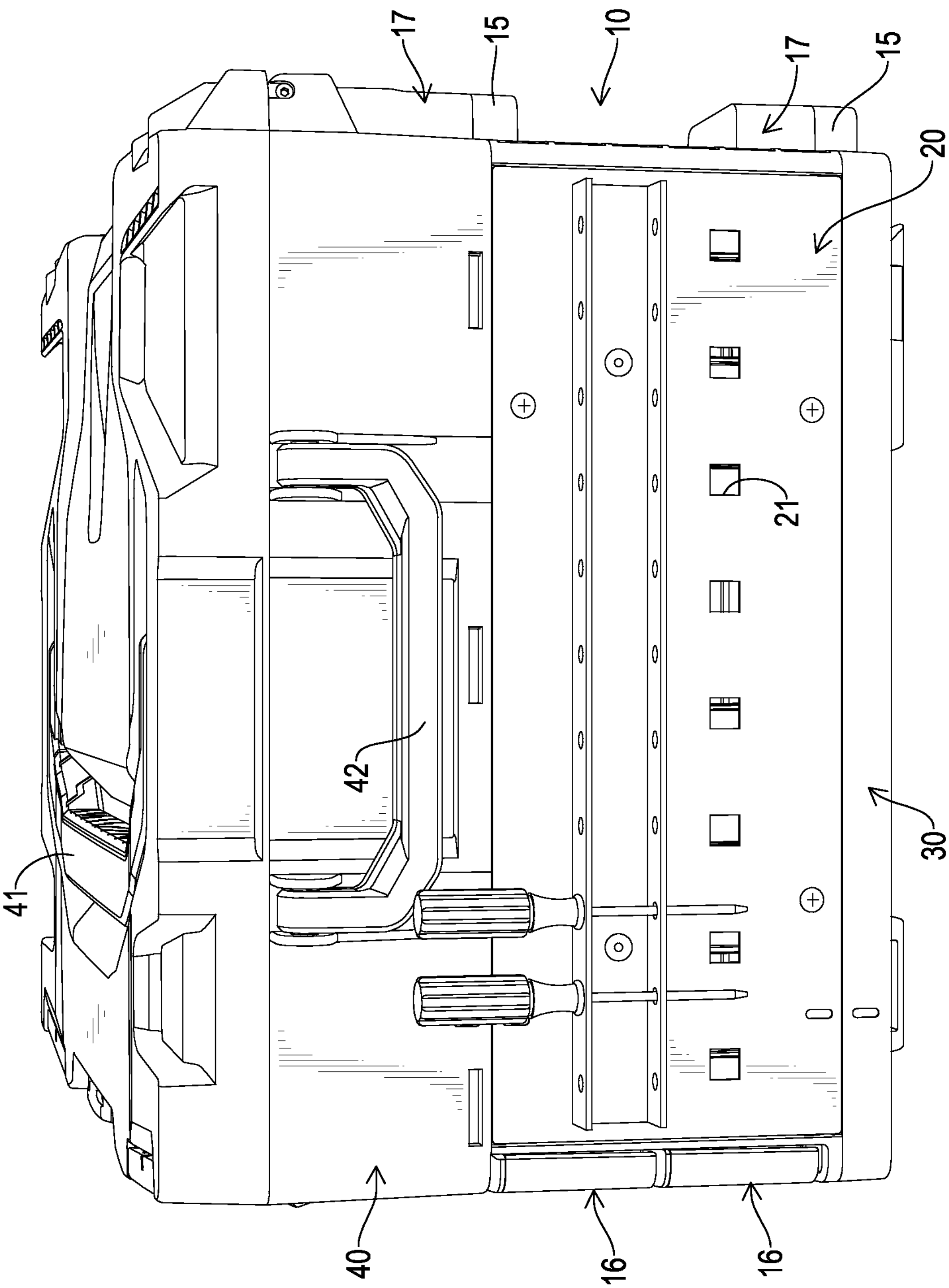
FIG. 9 is a side view of the tool box assembly in FIG. 1.

With reference to FIGS. 2, 3, and 9, the two pegboards 20 are respectively screwed to the two lateral plates 1121 of the surrounding wall 112. Each one of the two pegboards 20 has multiple peg holes 21 defined therethrough. Each peg hole 21 is configured to install a hook or for a hand tool to directly hang in the peg hole 21.

With reference to FIG. 2, a top portion of the basal plate 30 has six said first assembling structures 12. A rear side of the basal plate 30 has two said second positioning structures 15.

Figure 10:
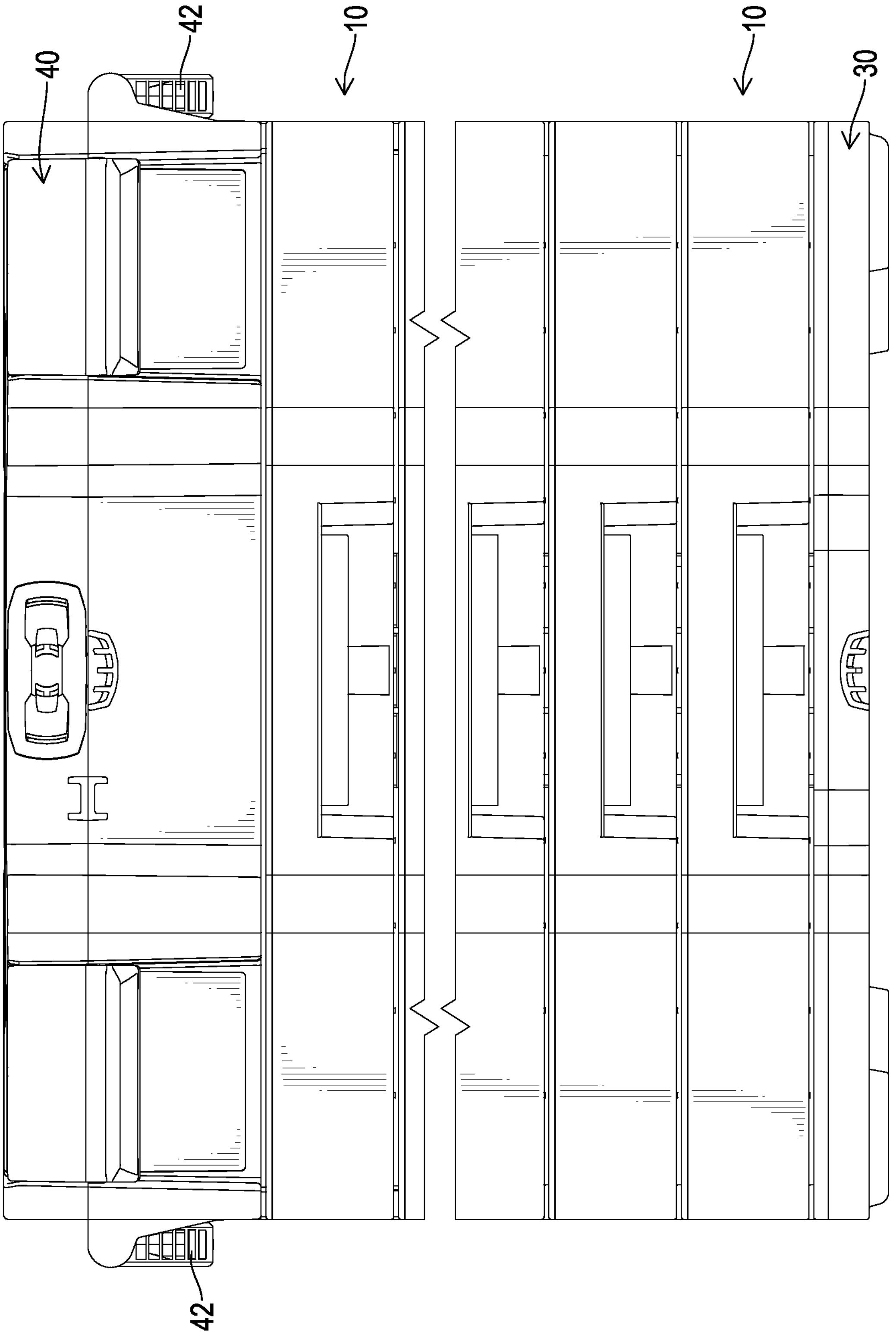
FIG. 10 is a front view of the tool box assembly in FIG. 1.

With reference to FIGS. 1, 2, and 10, the portable case 40 has a top grip 41, two lateral grips 42, six said second assembling structures 13, and two said first positioning structures 14. The top grip 41 is pivotally connected to a top portion of the portable case 40. The two lateral grips 42 are pivotally connected to two opposite sides of the portable case 40 respectively. Three of the six second assembling structures 13 of the portable case 40 are disposed at one of two sides of the portable case 40, and the other three of the six second assembling structures 13 of the portable case 40 are disposed at the other one of the two sides of the portable case 40.

With reference to FIG. 5, when the tool box 10 and the basal plate 30 are connected together, the six first assembling structures 12 of the tool box 10 are at first respectively aligned with the six second assembling structures 13 of the basal plate 30. The blocking plate 121 of each first assembling structure 12 of the tool box 10 is inserted to the inserting hole 131 of a corresponding one of the second assembling structures 13 of the basal plate 30. Then the tool box 10 is pulled backward to engage the blocking plate 121 of each first assembling structure 12 of the tool box 10 with the engaging groove 132 of a corresponding one of the second assembling structures 13 of the basal plate 30. The tool box 10 and the basal plate 30 are connected together accordingly.

Figure 7:
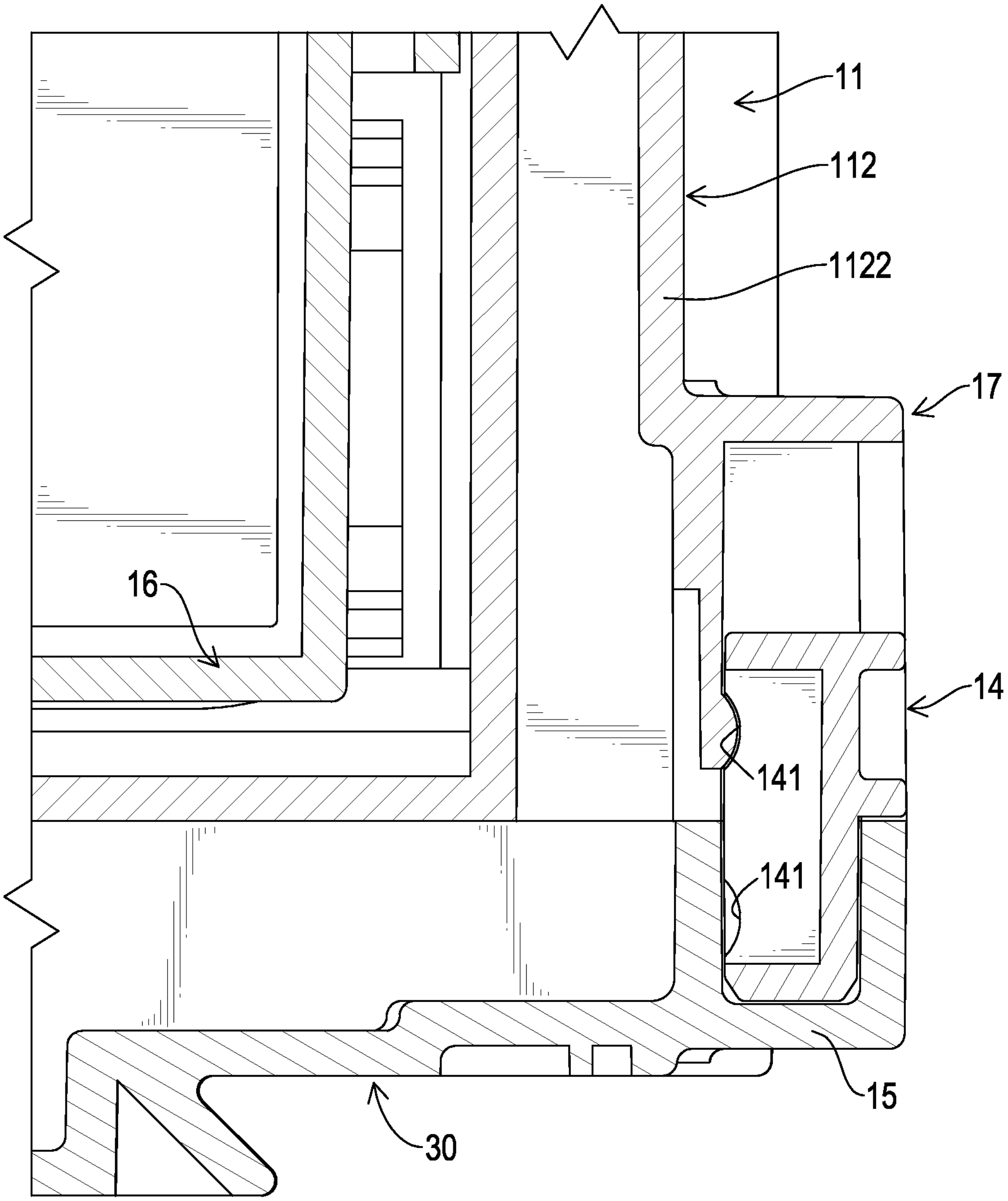
FIG. 7 is an enlarged side view in partial section of the tool box assembly in FIG. 1.
Figure 8:
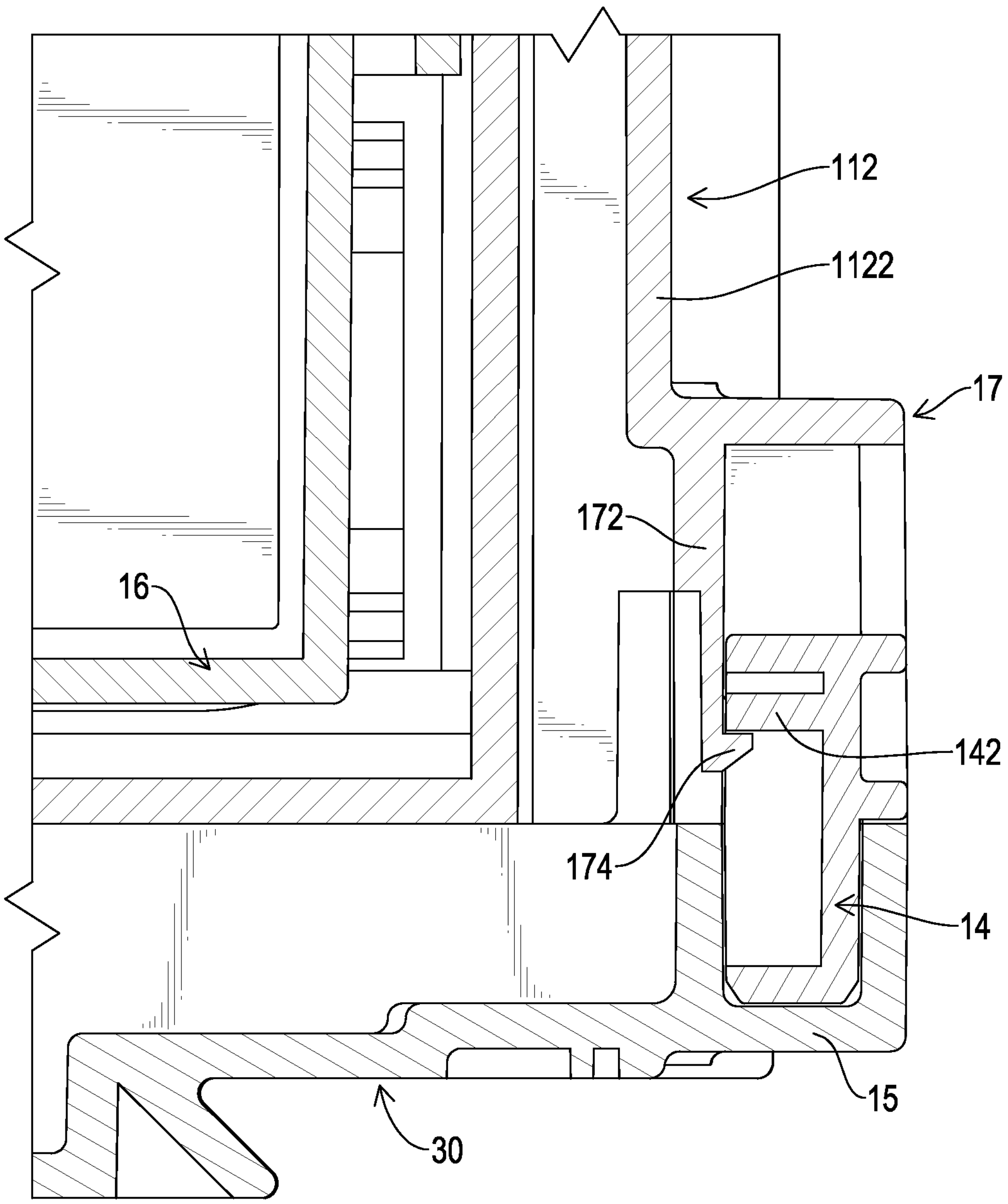
FIG. 8 is another enlarged side view in partial section of the tool box assembly in FIG. 1.

With reference to FIGS. 3, 7, and 8, the two positioning structures 14 of the tool box 10 are switched downward to respectively engage with the two second positioning structures 15 of the basal plate 30. The tool box 10 and the basal plate 30 are prevented from moving relative to each other and from accidently detaching from each other.

With reference to FIGS. 2 and 6, similarly, when the portable case 40 and the tool box 10 are assembled together, and the six second assembling structures 13 disposed at the bottom of the portable case 40 are respectively aligned with the first assembling structures 12 of the tool box 10 at first. The six second assembling structures 13 of the portable case 40 are respectively engaged with the six first assembling structures 12 of the tool box 10. Then the two first positioning structures 14 are switched down and respectively engaged with the two second positioning structures 15 of the tool box 10 to prevent the portable case 40 from moving relative to the tool box 10.

With reference to FIG. 10, the tool box assembly of the present invention may have multiple tool boxes 10. The tool boxes 10 can be assembled via said first assembling structures 12, said second assembling structures 13, said first positioning structures 14, and said second positioning structures 15 to longitudinally expand the tool box assembly. The amount of the tool boxes 10 is not restricted in the present invention.

In the embodiment of the present invention, the tool box 10 has two said drawers 16. Practically, the tool box 10 may have only one said drawer 16 to reduce the height of the surrounding wall 112 of the container 11 of the tool box 10. The amount of the drawer 16 is not restricted in the present invention.

Similarly, as long as each said first positioning structure 14 is able to be engaged with each said second positioning structure 15, the actual structures of each first positioning structure 14 and each second positioning structure 15 are not restricted.

In the present invention, the container 11 of the tool box 10 omits a top plate and has said top opening 114. The space occupied by the top plate can be saved when the tool box assembly of the present invention is longitudinally assembled and expanded. Therefore, the tool box assembly of the present invention occupies less space. Compared to the traditional tool box or the conventional tool box, the tool box assembly of the present invention saves the space occupied by the top plate and provides a better space efficiency.

With reference to FIG. 10, the two lateral grips 40 are respectively disposed at the two opposite sides of the portable case 40. When the multiple tool boxes 10 are longitudinally assembled and expanded, a user can move the tool box assembly of the present invention by holding the two lateral grips 40 with two hands. The tool box assembly of the present invention may be moved by two users. Therefore, the tool box assembly of the present invention can be moved conveniently.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A tool box assembly comprising:
multiple tool boxes, each one of the multiple tool boxes having
a container having
a base being a plate;
a surrounding wall erectly disposed at the base and having a top portion disposed opposite to the base;
a front opening formed by the surrounding wall and communicating with an interior of the container; and
a top opening formed by the surrounding wall, disposed at a highest portion of the container, and communicating with the interior of the container;
multiple first assembling structures disposed at the top portion of the surrounding wall;
multiple second assembling structures disposed at the base, each second assembling structure corresponding to each first assembling structure in structure; and
multiple drawers disposed within the container and configured to enter or exit from the container via the front opening.

2. The tool box assembly as claimed in claim 1, wherein
each one of the multiple first assembling structures of each one of the multiple tool boxes has a blocking plate laterally protruding and extending toward the front opening of the container of the tool box;
each one of the multiple second assembling structures of each one of the multiple tool boxes has
an engaging groove; and
an inserting hole communicating with the engaging groove in a direction toward the front opening of the container of the tool box and having a width being larger than a width of the engaging groove; and
the blocking plate of each one of the multiple first assembling structures is configured to be inserted to and engaged with the inserting hole and the engaging groove of each one of the multiple second assembling structures of the container of another tool box.

3. The tool box assembly as claimed in claim 1, wherein
each one of the multiple second assembling structures of each one of the multiple tool boxes has a blocking plate laterally protruding and extending toward the front opening of the container of the tool box;
each one of the multiple first assembling structures of each one of the multiple tool boxes has
an engaging groove; and
an inserting hole communicating with the engaging groove in a direction toward the front opening of the container of the tool box and having a width being larger than a width of the engaging groove; and
the blocking plate of each one of the multiple second assembling structures is configured to be inserted to and engaged with the inserting hole and the engaging groove of each one of the multiple first assembling structures of the container of another tool box.

4. The tool box assembly as claimed in claim 2, wherein
each one of the multiple tool boxes has multiple first positioning structures and multiple second positioning structures;
the multiple first positioning structures and the multiple second positioning structures of the each one of the multiple tool boxes are disposed at the surrounding wall of the container of the tool box; and
each second positioning structure corresponds to each first positioning structure in structure.

5. The tool box assembly as claimed in claim 3, wherein
each one of the multiple tool boxes has multiple first positioning structures and multiple second positioning structures;
the multiple first positioning structures and the multiple second positioning structures of each one of the multiple tool boxes are disposed at the surrounding wall of the container of the tool box; and
each first positioning structure corresponds to each second positioning structure in structure.

6. The tool box assembly as claimed in claim 4, wherein
the first positioning structure of each one of the multiple tool boxes is an engaging unit which is connected to the surrounding wall of the container of the tool box and is longitudinally moveable relative to the tool box; and
the second positioning structure of each one of the multiple tool boxes is a recess.

7. The tool box assembly as claimed in claim 5, wherein
the first positioning structure of each one of the multiple tool boxes is an engaging unit which is connected to the surrounding wall of the container of the tool box and is longitudinally moveable relative to the tool box; and
the second positioning structure of each one of the multiple tool boxes is a recess.

8. The tool box assembly as claimed in claim 1, wherein
the surrounding wall of the container of each one of the multiple tool boxes has multiple engaging holes disposed therein;
each one of the multiple drawers of each one of the multiple tool boxes has
a drawer body;
a handle pivotally connected to the drawer body and having multiple hooks; and
a torsion spring connected to the handle and abutting against the drawer body and the handle simultaneously; and
the handle of each one of the multiple drawers of each one of the multiple tool boxes is configured to be driven by the torsion spring of the drawer to respectively engage with the multiple engaging holes via the multiple hooks of the handle.

9. The tool box assembly as claimed in claim 1, wherein
each one of the multiple tool boxes has multiple pegboards;
each one of the multiple pegboards of each one of the tool boxes is connected to the surrounding wall of the tool box and has multiple peg holes defined therethrough.

10. The tool box assembly as claimed in claim 1, wherein
the tool box assembly has a portable case having multiple said second assembling structures;
the portable case is configured to be connected to one of the multiple tool boxes; and
the multiple second assembling structures of the portable case are configured to be respectively engaged with the multiple first assembling structures of each one of the multiple tool boxes.

11. The tool box assembly as claimed in claim 10, wherein the portable case has two lateral grips pivotally connected to two opposite sides of the portable case.

12. The tool box assembly as claimed in claim 1, wherein
each one of the multiple tool boxes has multiple first positioning structures and multiple second positioning structures;
each one of the multiple second positioning structures is configured to engage with each one of the multiple first positioning structures;
each one of the multiple first positioning structures of each one of the multiple tool boxes is an engaging unit connected to the tool box and being longitudinally moveable relative to the tool box; and
each one of the multiple second positioning structures of the multiple tool boxes is a recess.

* * * * *